United States Patent
Hughes et al.

(10) Patent No.: US 9,069,671 B2
(45) Date of Patent: *Jun. 30, 2015

(54) GATHER AND SCATTER OPERATIONS IN MULTI-LEVEL MEMORY HIERARCHY

(71) Applicant: Intel Corporation, Santa Clara, CA (US)

(72) Inventors: Christopher J. Hughes, Santa Clara, CA (US); Yen-Kuang Chen, Cupertino, CA (US); Changkyu Kim, San Jose, CA (US); Daehyun Kim, San Jose, CA (US); Victor W. Lee, Santa Clara, CA (US); Anthony-Trung D. Nguyen, Castro Valley, CA (US); Nadathur Rajagopalan Satish, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/337,174

(22) Filed: Jul. 21, 2014

(65) Prior Publication Data

US 2014/0337580 A1    Nov. 13, 2014

Related U.S. Application Data

(63) Continuation of application No. 13/934,198, filed on Jul. 2, 2013, now Pat. No. 8,799,577, which is a continuation of application No. 13/557,164, filed on Jul. 24, 2012, now Pat. No. 8,478,941, which is a continuation of application No. 12/630,826, filed on Dec. 3, 2009, now Pat. No. 8,230,172.

(51) Int. Cl.
*G06F 12/08* (2006.01)
*G06F 9/30* (2006.01)

(52) U.S. Cl.
CPC ........ *G06F 12/0811* (2013.01); *G06F 12/0802* (2013.01); *G06F 12/0897* (2013.01); *G06F 9/30043* (2013.01); *G06F 2212/62* (2013.01); *Y02B 60/1225* (2013.01)

(58) Field of Classification Search
CPC .. G06F 12/08; G06F 12/0811; G06F 12/0897
See application file for complete search history.

(56) References Cited

U.S. PATENT DOCUMENTS

| | | | |
|---|---|---|---|
| 3,643,215 A | 2/1972 | Ingham et al. | |
| 6,085,193 A | 7/2000 | Malkin et al. | |
| 6,535,961 B2 | 3/2003 | Wilkerson et al. | |
| 7,822,658 B2 | 10/2010 | Casati et al. | |
| 8,230,172 B2 * | 7/2012 | Hughes et al. | 711/118 |
| 8,478,941 B2 * | 7/2013 | Hughes et al. | 711/118 |
| 8,799,577 B2 * | 8/2014 | Hughes et al. | 711/118 |

* cited by examiner

*Primary Examiner* — Hiep Nguyen

(74) *Attorney, Agent, or Firm* — Mnemoglyphics, LLC; Lawrence M. Mennemeier

(57) ABSTRACT

Methods and apparatus relating to gather or scatter operations in a multi-level cache are described. In some embodiments, a logic may determine whether to perform gather or scatter operations at a first memory or a second memory, based in part on a relative performance of performing the gather or scatter operations at the first memory and the second memory. Other embodiments are also described and claimed.

20 Claims, 6 Drawing Sheets

GATHER AND SCATTER OPERATIONS IN MULTI-LEVEL MEMORY HIERARCHY

RELATED APPLICATIONS

This is a Continuation of application Ser. No. 13/934,198, filed Jul. 2, 2013, presently pending, which is a Continuation of application Ser. No. 13/557,164, filed Jul. 24, 2012, now U.S. Pat. No. 8,478,941, which is a Continuation of application Ser. No. 12/630,826, filed Dec. 3, 2009, now U.S. Pat. No. 8,230,172.

FIELD OF THE INVENTION

The present disclosure generally relates to the field of electronics. More particularly, an embodiment of the invention relates to gather and scatter operations in a multi-level memory hierarchy.

BACKGROUND OF THE INVENTION

To improve performance, some processors may access data that is stored in a cache. Generally, data stored in a cache may be accessed more quickly than data stored in a main system memory. In some implementations, multiple levels of cache may be present, for example, with each level having a different size and/or access speed. Accordingly, system performance may be dependent on how the cache or its multiple levels are used.

Further, some processors operate on multiple pieces of data with a single instruction, also known as single-instruction-multiple-data (SIMD) processing. Some implementations include gather and scatter instructions. These instructions collect pieces of possibly noncontiguous data in memory for SIMD processing.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
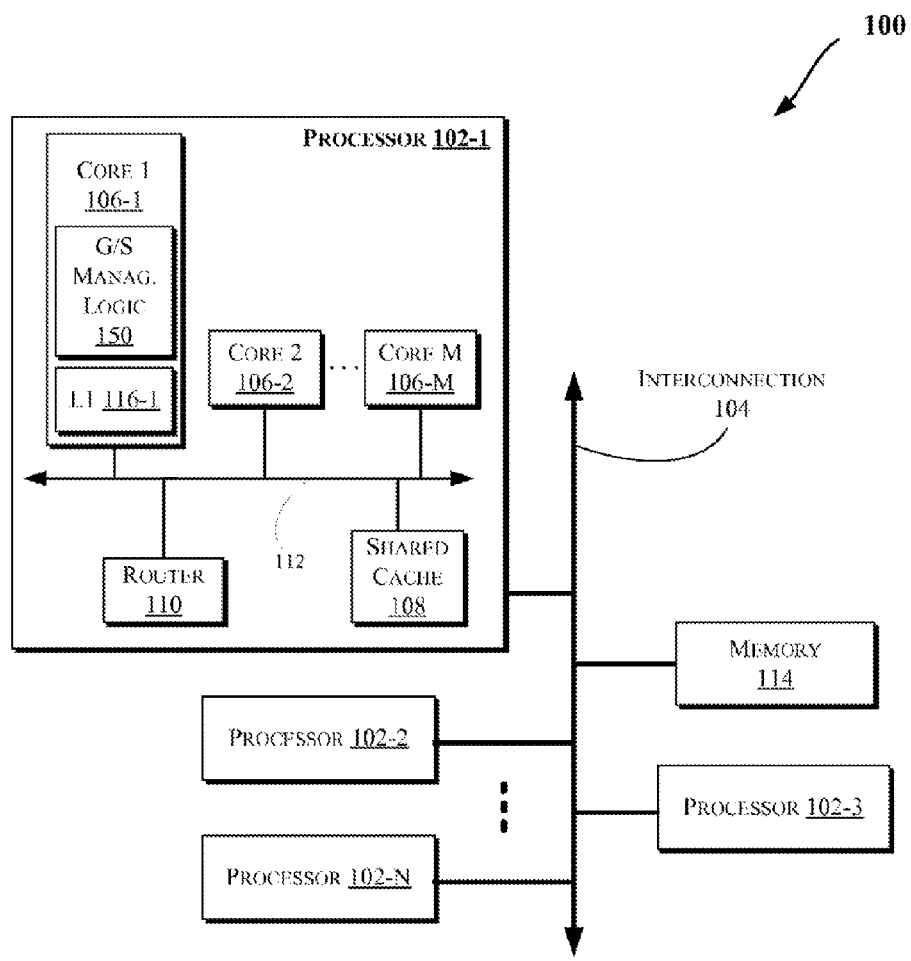
FIGS. 1 and 5-6 illustrate block diagrams of embodiments of computing systems, which may be utilized to implement various embodiments discussed herein.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof. Also, even though some embodiments discussed herein may refer to a set or clear value as logical 0 and 1, respectively, these terms are interchangeable, e.g., depending on the implementation. Also, the use of "instruction" or "micro-operation" (which may also be referred to as "uop") herein may be interchangeable.

Some embodiments may allow for performing gather or scatter operations at more than one level of a multi-level memory hierarchy. As discussed herein, a memory hierarchy may be interchangeably used with a cache hierarchy. Accordingly, the terms "memory" and "cache" may be interchangeable herein. For example, for large data structures that will not fit in a single cache level or that may benefit from being stored at a different cache level or even at main memory, gather or scatter operations may be performed at a cache or memory level that is determined to be the most efficient. Generally, gather and scatter refer to data-parallel or vector operations (e.g., in Single-Instruction, Multiple-Data (SIMD) processors), where a large number of data items are loaded (gathered) from or are stored (scattered) to given storage locations.

Moreover, applications that rely on gather and scatter operations to obtain benefit from wide SIMD fall into the following two categories which may have differing hardware solutions:

(1) Applications that gather and scatter data with a lot of spatial and/or temporal locality. Performing gathers and scatters from/to the highest level cache (e.g., Level 1 (L1) cache) works well for these applications; and (2) Applications that gather and scatter data with little locality. Performing gathers and scatters from/to a lower level cache (e.g., Level 2 (L2), Level 3 (L3), etc.) or even main memory is much more efficient for these applications.

Current gather/scatter solutions however may perform the operations at a single level in the memory hierarchy, harming performance of one of these classes of applications. To this end, some embodiments provide higher performance, lower bandwidth usage, and/or lower power consumption for a host of compute-intensive applications.

In an embodiment, a gather and scatter logic is provided that is capable of performing gathers and scatters at more than one level of the memory hierarchy. Also, a level controller logic may steer gathers and scatters to the most appropriate level of the hierarchy in one embodiment, e.g., based on a determination by a locality predictor (for example, based on locality measurements). In some embodiments, gather and scatter operations may be made invisible to the programming model. That is, the application could use conventional gather and scatter instructions, and the hardware may simply steer each operation to whichever level of the hierarchy it determines to be more efficient.

Techniques described herein may allow for improved performance in various computing devices, such as those discussed for example with reference to FIGS. 1-6. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components, some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 5 and 6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a Mid-Level Cache (MLC) (such as a Level 2 (L2), a Level 3 (L3), a Level 4 (L4), or other levels of cache), a Last Level Cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a Level 1 (L1) cache (116-1) (generally referred to herein as "L1 cache 116") and/or an L2 cache (not shown).

Also, processor 102-1 may include a Gather/Scatter (G/S) management logic 150 to perform operations related to gather/scatter operations, as will be further discussed herein with reference to FIGS. 2-6. Although logic 150 is shown to be inside core 106-1, logic 150 may be provided elsewhere in the system in various embodiments. Also, in some embodiments, the G/S management logic 150 (or any of its components discussed herein) may be shared amongst a plurality of processor cores.

Figure 2:
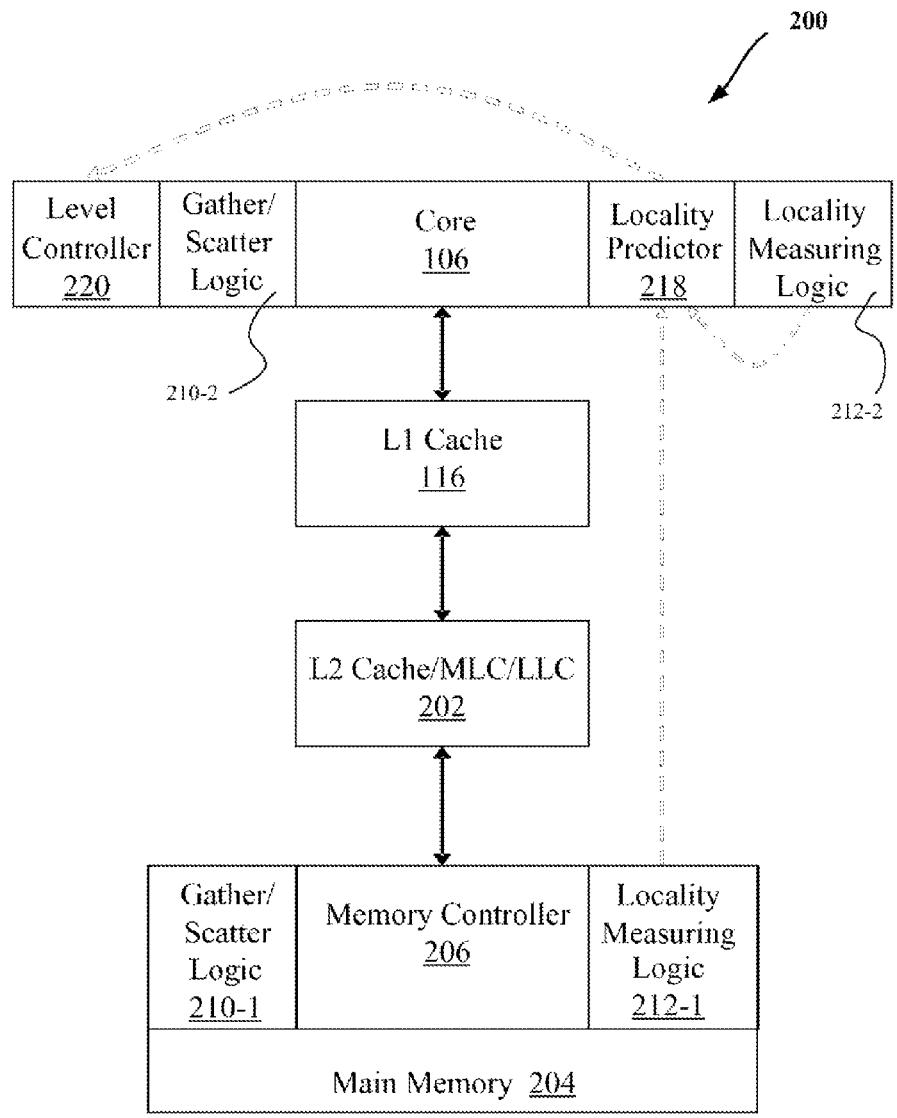
FIG. 2 illustrates a block diagram of a gather and scatter system, in accordance with an embodiment.

FIG. 2 illustrates a block diagram of a gather and scatter system 200, in accordance with an embodiment. As shown, system 200 includes a single core 106 (although more than one core may be present in a system), an L1 cache 116, an L2 cache 202 (MLC, LLC, etc. or generally a cache having a lower level than L1 cache 116), and main memory 204 and a corresponding memory controller 206 (which may be the same or similar to the memory 512/610/612 and memory controllers 510/606/608 of FIGS. 5-6).

The memory controller 206 may include (a) a gather/scatter logic 210-1 to perform or execute gather/scatter operations (this could be in the memory controller rather than in the main memory 204), and (b) a locality measuring logic 212-1 to measure the locality of the data gathered or scattered. As shown in FIG. 2, logics 210-1 and/or 212-1 (illustrated as 210-2 and 212-2, respectively) may also be provided at the core 106 (or within it as will be further discussed with reference to FIG. 3). In some embodiments, logics 210-1/210-2 and/or 212-1/212-2 may be provided in one or more locations such as illustrated in FIG. 2 and discussed here. For simplicity, these logics will be respectively referred to as 210 and 212. The gather/scatter logic 210 may perform gathering/scattering out of the L1 cache 116. System 200 (e.g., at the core 106) may include a logic 218 to predict the locality of subsequent gathers and scatters using current and previous information from the locality measuring logic 212 in the core 106 and the memory controller 206. System 200 may additionally include a level controller logic 220 to control at which cache/memory level the gather/scatter is to be performed and/or cause storage and/or retrieval locality predictions for each gather/scatter operation. Storage of data (including data corresponding to predictions, measurements, etc.) may be performed at any storage device (including cache(s), main memory, system memory, disk drive, remote storage available through wired or wireless network connection(s), etc.) discussed herein, e.g., with reference to FIGS. 1-6.

Figure 3:
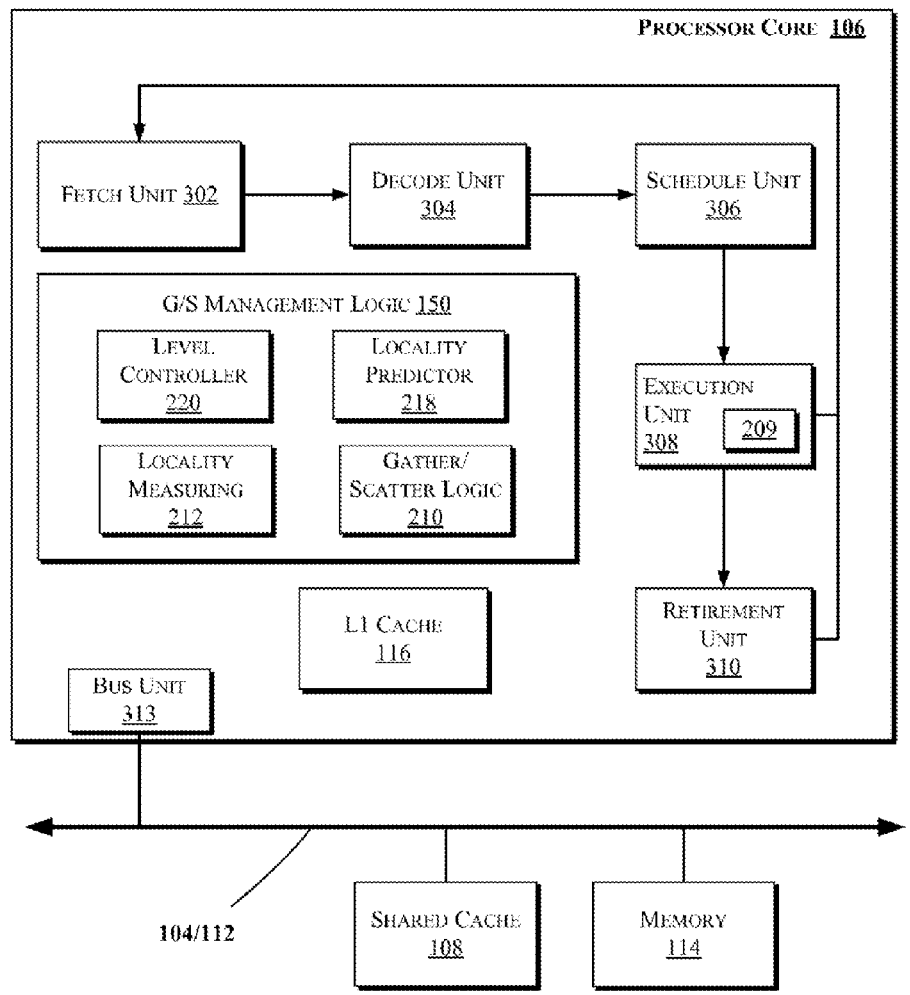
FIG. 3 illustrates a block diagram of portions of a processor core and other components of a computing system, according to an embodiment of the invention.

FIG. 3 illustrates a block diagram of portions of a processor core and other components of a computing system, according to an embodiment of the invention. In an embodiment, at least some of processors discussed herein (e.g., with reference to FIG. 1-2, 5, or 6) may include one or more of the component of the processor core 106 shown in FIG. 3. Also, a processor may include a single or multi-core 106, which may be homogeneous/symmetric or heterogeneous/asymmetric, etc. such as discussed herein, e.g., with reference to FIG. 1, 5, or 6. In one embodiment, the arrows shown in FIG. 3 illustrate the flow direction of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), memory controllers, or other components.

As illustrated in FIG. 3, the processor core 106 may include a fetch unit 302 to fetch instructions for execution by the core 106. The instructions may be fetched from any storage devices such as the memory 114 and/or the memory devices discussed with reference to FIG. 5 or 6. The core 106 may optionally include a decode unit 304 to decode the fetched instruction. In an embodiment, the decode unit 304 may decode the fetched instruction into a plurality of uops (microoperations). Some embodiments of the processor core 106 may not include decode unit 304. Hence, the core 106 may process instructions without decoding them. Additionally, the core 106 may include a schedule unit 306. The schedule unit 306 may perform various operations associated with storing decoded instructions (e.g., received from the decode unit 304) until the instructions are ready for dispatch, e.g., until all source values of a decoded instruction become available.

In one embodiment, the schedule unit 306 may schedule and/or issue (or dispatch) decoded instructions to an execution unit 308 for execution. The execution unit 308 may execute the dispatched instructions after they are dispatched (e.g., by the schedule unit 306) and, if applicable, decoded (e.g., by the decode unit 304). In an embodiment, the execution unit 308 may include more than one execution unit, such as one or more memory execution units, one or more integer execution units, one or more floating-point execution units (209), or other execution units. The execution unit 308 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 308.

Further, the execution unit 308 may execute instructions out-of-order. Hence, the processor core 106 may be an out-of-order processor core in one embodiment. The core 106 may also include a retirement unit 310. The retirement unit 310 may retire executed instructions (e.g., in order) after they are committed. In an embodiment, retirement of the executed instructions may result in processor state being committed from the execution of the instructions, physical registers used by the instructions being de-allocated, etc.

The core 106 may further include the gather and scatter management logic 150 (such as the logic 150 discussed with respect to any of the previous figures). Additionally, the core 106 may include a bus unit 313 to allow communication between components of the processor core 106 and other components (such as the components discussed with reference to FIG. 1, 5, or 6) via one or more buses (e.g., buses 104 and/or 112).

As shown in FIG. 3, the logic 150 may include the level controller 220 (e.g., to retrieve a prediction when a gather or scatter is executed and to trigger the operation at the specified level of the hierarchy), locality predictor logic 218 (e.g., to predict the best level in the hierarchy to perform future gathers and scatters based on current and previous locality measurements), locality measuring logic 212 (e.g., to measure the temporal and spatial locality of data being gathered and scattered, and/or cause storage of the measured data), and gather/scatter logic 210 to perform gather/scatter operations such as discussed with reference to FIGS. 1-2 and 4-6. As discussed herein, logic 150 (or any of its components) may be provided in various locations within a computing system. Also, storage of data (including data corresponding to predictions, measurements, etc.) may be performed at any storage device (including cache(s), main memory, system memory, disk drive, remote storage available through wired or wireless network connection(s), etc.) discussed herein, e.g., with reference to FIGS. 1-6.

In an embodiment, measuring data locality (e.g., by logic 212) for a given gather or scatter operation (e.g., on a fixed number of data elements) may be done as follows. Spatial locality may be measured by counting the number of cache lines accessed. For example, in some applications, a 16-element gather or scatter may touch only two or three cache lines. Temporal locality may be measured by counting the number of cache hits at a given level of the memory hierarchy. For example, in some applications, a 32 KB L1 may provide over a 90% hit rate for gathers and scatters.

Furthermore, predicting (e.g., at logic 218) the most efficient level in the hierarchy for gathers and scatter operations may be done a number of different ways. One possibility is as follows for a system where gathers and scatters are performed either at the L1 or main memory. We may have a threshold for cache hits for a single gather or scatter operation, and if the number of hits from the L1 exceeds that threshold, we predict that this will continue, and thus the L1 is the best level to perform gathers and scatters. If the number of cache hits is too low (e.g., below a threshold), we then check the spatial locality. We may compare the number of cache lines touched for a single gather or scatter to another threshold. If we are below the threshold, then the spatial locality is large enough, and we predict that the L1 is the best level for the future.

Moreover, a range of prediction storage mechanisms are possible in various embodiments. In one embodiment, a single register (possibly even a single bit) may be used to record the prediction of which level is best or most efficient for future gathers and scatters. In another embodiment, per-static-instruction predictions may be recorded in an IP-indexed (Instruction Pointer indexed) table. Further, the storage could also be involved in a prediction-feedback configuration. For example, a table of two-bit saturating counters may be used, e.g., such as is used in branch prediction. For example, the counter may be incremented each time a gather/scatter is performed that the predictor determines should have been done in main memory, and decremented otherwise.

In one embodiment, the design of the level controller logic 220 depends on the storage mechanism, but at a high level the logic 220 performs a lookup into a storage unit, makes a decision based on the value(s) in the storage unit, and sends appropriate signals to the gather/scatter logic 210 to initiate the operation at the chosen level of the hierarchy (either directly or via bits embedded in a memory request, for example). An example of the controller's decision making logic is to use the most significant bit of a two-bit saturating counter to determine the level (e.g., 0=L1, 1=main memory).

Figure 4:
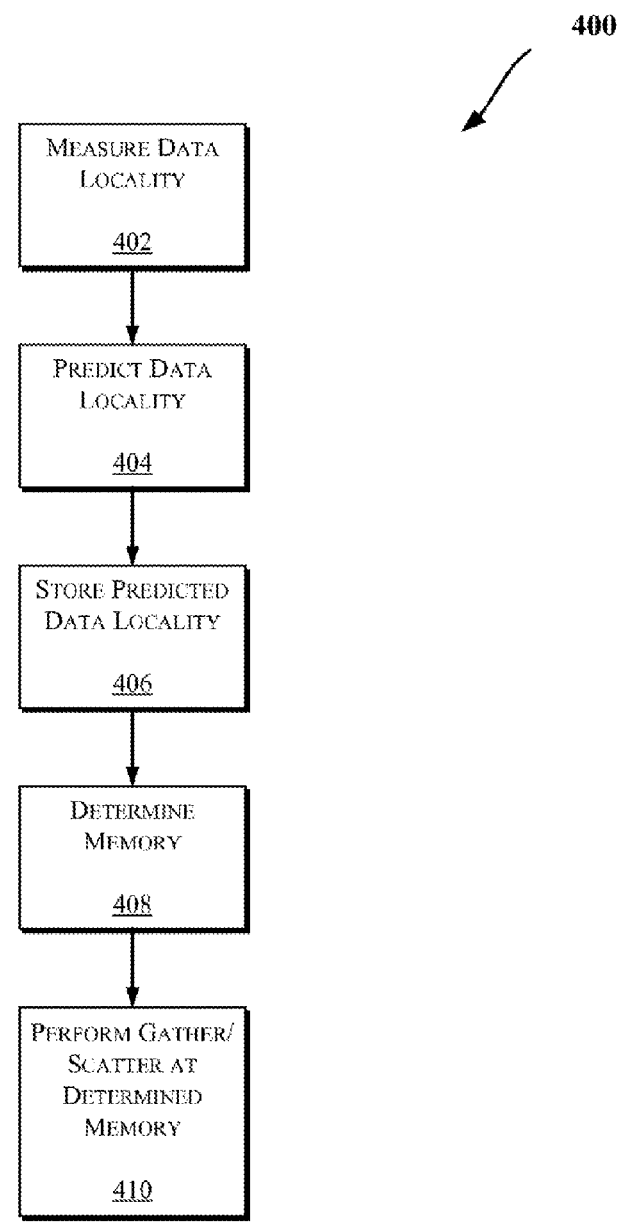
FIG. 4 illustrates a flow diagram according to an embodiment.

FIG. 4 illustrates a flow diagram of method 400 to perform gather/scatter operations at a determined cache/memory level, according to an embodiment. In some embodiments, the components discussed with reference to FIGS. 1-3 and 5-6 may be used to perform the operations of method 400.

Referring to FIGS. 1-4, at an operation 402, locality of data may be measured (e.g., by logic 212 such as discussed with reference to FIGS. 1-3). At an operation 404, data locality may be predicted for a future scatter/gather operation (e.g., by logic 218 such as discussed with reference to FIGS. 1-3). At an operation 406, the predicted locality data may be stored (e.g., in any of the storage units discussed herein). At an operation 408, the memory level at which to perform the gather/scatter operation may be determined (e.g., by logic 220 such as discussed with reference to FIGS. 1-3), for example, based at least in part on the relative performance of a first memory level and a second memory level. The method 400 terminates by operation 410 at which gather/scatter operation(s) are performed at a determined memory level (e.g., by logic 210 such as discussed with reference to FIGS. 1-3).

Figure 5:
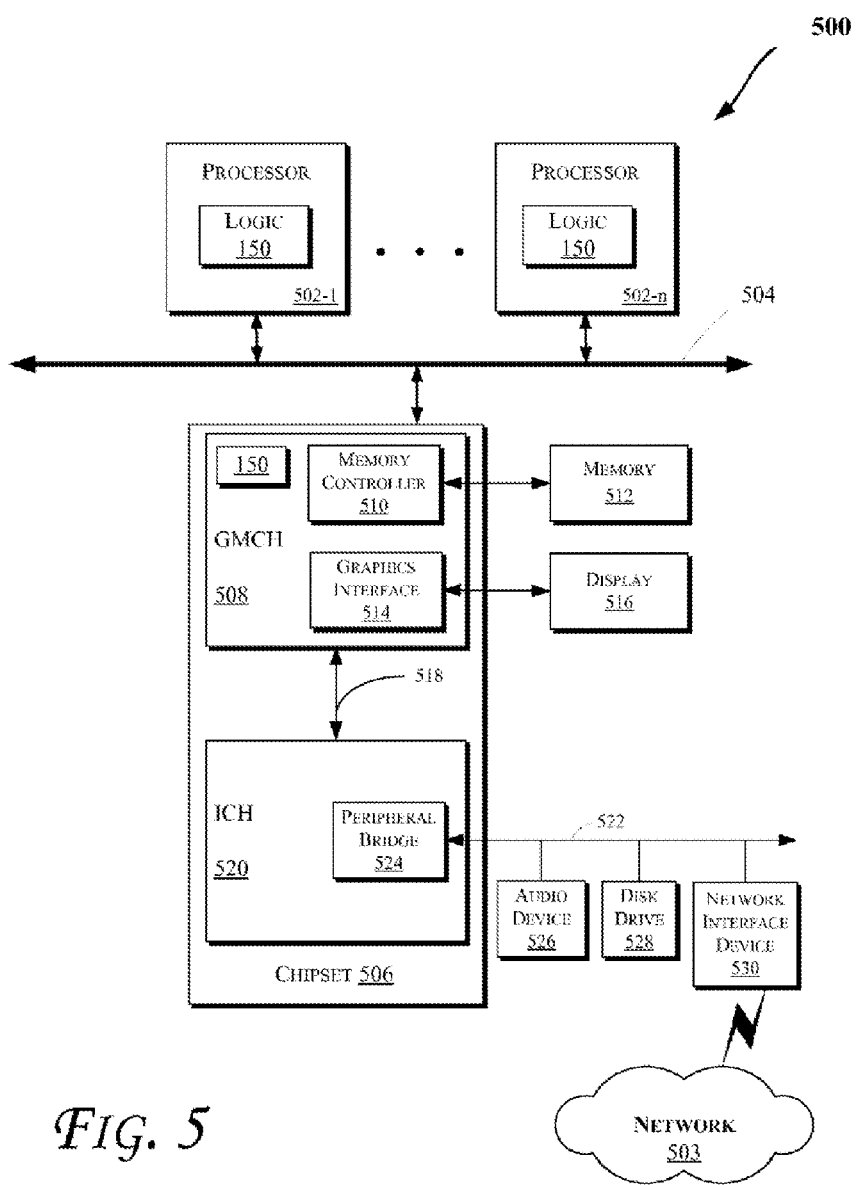

FIG. 5 illustrates a block diagram of a computing system 500 in accordance with an embodiment of the invention. The computing system 500 may include one or more central processing unit(s) (CPUs) 502 or processors that communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In an embodiment, one or more of the processors 502 may be the same or similar to the processors 102 of FIG. 1. For example, one or more of the processors 502 may include one or more of the caches, storage devices, and/or components of logic 150 discussed with reference to FIGS. 1-4. Also, the operations discussed with reference to FIGS. 1-4 may be performed by one or more components of the system 500.

A chipset 506 may also communicate with the interconnection network 504. The chipset 506 may include a graphics and memory control hub (GMCH) 508. The GMCH 508 may include a memory controller 510 that communicates with a memory 512 (which may be the same or similar to the memory 114 of FIG. 1). The memory 512 may store data, including sequences of instructions, that may be executed by the CPU 502, or any other device included in the computing system 500. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The GMCH 508 may also include a graphics interface 514 that communicates with a display device 516. In one embodiment of the invention, the graphics interface 514 may communicate with the display device 516 via an accelerated graphics port (AGP). In an embodiment of the invention, the display 516 (such as a flat panel display) may communicate with the graphics interface 514 through, for example, a signal converter that translates a digital representation of an image stored in a storage device such as video memory or system memory into display signals that are interpreted and displayed by the display 516. The display signals produced by the display device may pass through various control devices before being interpreted by and subsequently displayed on the display 516.

A hub interface 518 may allow the GMCH 508 and an input/output control hub (ICH) 520 to communicate. The ICH 520 may provide an interface to I/O device(s) that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503). Other devices may communicate via the bus 522. Also, various components (such as the network interface device 530) may communicate with the GMCH 508 in some embodiments of the invention. In addition, the processor 502 and other components shown in FIG. 5 (including but not limited to the GMCH 508, one or more components of the GMCH 508, etc.) may be combined to form a single chip. Furthermore, a graphics accelerator may be included within the GMCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
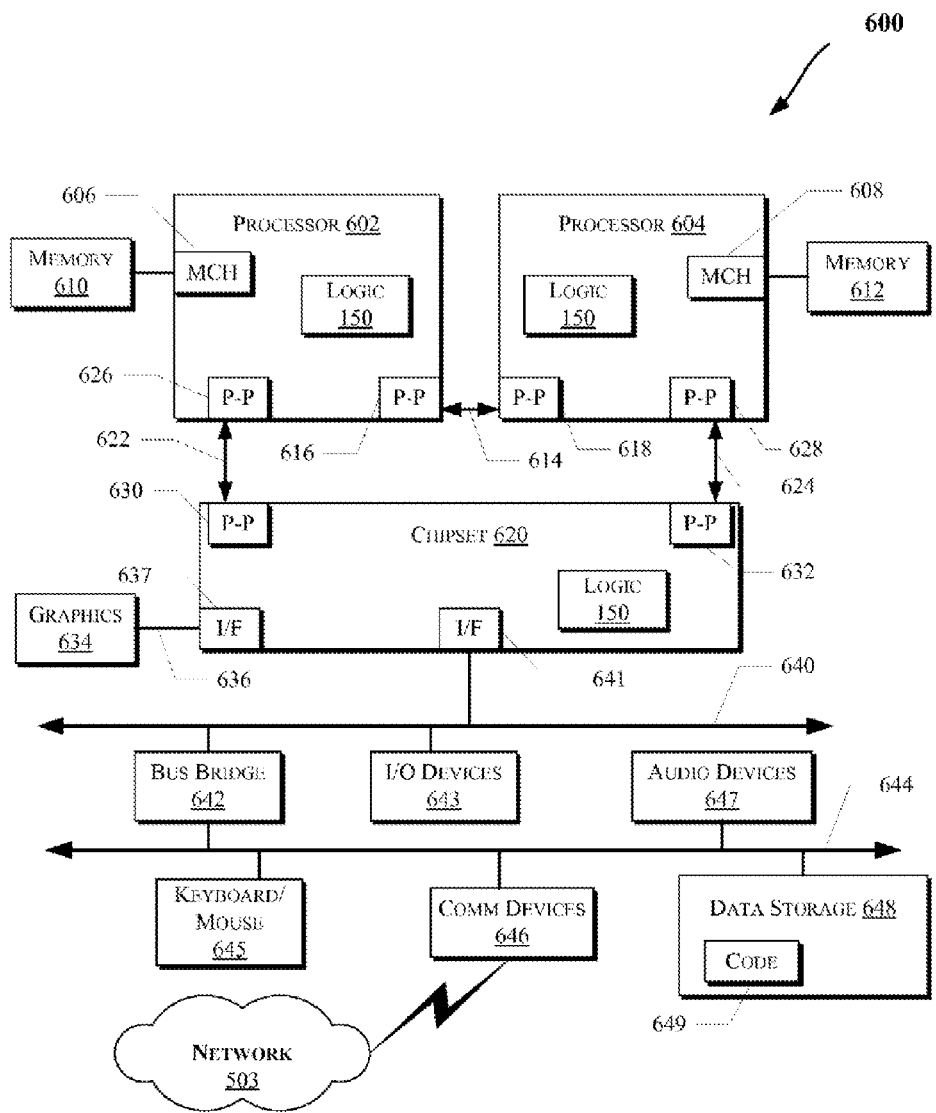

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5.

In an embodiment, the processors 602 and 604 may be one of the processors 502 discussed with reference to FIG. 5, e.g., including one or more of the caches discussed with reference to FIGS. 1-5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a graphics circuit 634 via a graphics interface 636, e.g., using a PtP interface circuit 637.

At least one embodiment of the invention may be provided within the processors 602 and 604. For example, one or more of the cores 106 of FIG. 1 may be located within the processors 602 and 604. Also, processors 602 and 604 may include one or more of the caches, storage devices, and/or components of logic 150 discussed with reference to FIGS. 1-5. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 using a PtP interface circuit 641. The bus 640 may communicate with one or more devices, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503), audio I/O device 647, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed herein.

Additionally, such tangible computer-readable media may be downloaded as a computer program product, wherein the program may be transferred from a remote computer (e.g., a server) to a requesting computer (e.g., a client) by way of data signals in a propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
   a first level cache of a multiple level memory hierarchy; and
   a locality predictor logic to predict the best level in the hierarchy to perform future gathers and scatters based on any current and previous locality measurements of spatial and/or temporal locality for one or more current or previous gather or scatter operations and to store one or more locality predictions for gather or scatter data, wherein future gather or scatter operations are to be steered to a lower level of the multiple level memory hierarchy than the first level cache based on one or more stored locality predictions for gather or scatter data of little locality.

2. The apparatus of claim 1 wherein future gather or scatter operations are to be steered to a main memory level of the multiple level memory hierarchy based on the one or more stored locality predictions for gather or scatter data of little locality.

3. The apparatus of claim 1 wherein future gather or scatter operations are to be steered to a lower level cache of the multiple level memory hierarchy based on the one or more stored locality predictions for gather or scatter data of little locality.

4. The apparatus of claim 1, wherein one of the one or more locality predictions is based on a threshold for cache hits of performing the gather or scatter operations at the first level.

5. The apparatus of claim 4, wherein said locality measurements include a spatial locality measured by counting a number of cache lines accessed for said one or more current or previous gather or scatter operations.

6. The apparatus of claim 1, wherein said locality measurements include a temporal locality measured by counting a number of cache hits for said one or more current or previous gather or scatter operations at a given level of the memory hierarchy.

7. The apparatus of claim 6, wherein the locality predictor logic is to predict the efficiency based in part on a combination of a spatial locality of data for said one or more current or previous gather or scatter operations and a predicted cache hit rate.

8. The apparatus of claim 7, wherein the locality predictor logic is to predict the efficiency based on a threshold number of cache lines touched for a single gather or scatter operation if the predicted cache hit rate is too low.

9. The apparatus of claim 6, wherein the locality predictor logic is to predict the efficiency based on the temporal locality measured in the first level cache for a single gather or scatter operation.

10. A method comprising:
    determining whether to perform future gather or scatter operations at a first level of a multiple level memory hierarchy, based on any current and previous locality measurements of spatial and/or temporal locality for one or more current or previous gather or scatter operations.

11. The method of claim 10, wherein future gather or scatter operations are to be steered to a main memory level of the multiple level memory hierarchy based on the one or more stored locality prediction for gather or scatter data of little locality.

12. The method of claim 10, wherein said locality measurements include a spatial locality measured by counting a number of cache lines accessed for said one or more current or previous gather or scatter operations.

13. The method of claim 12, wherein determining whether to perform the gather or scatter operations at the first level, is based a threshold number of cache lines accessed for a single gather or scatter operation if a predicted cache hit rate is too low.

14. The method of claim 10, wherein said locality measurements include a temporal locality measured by counting a number of cache hits for said one or more current or previous gather or scatter operations at a given level of the memory hierarchy.

15. A system comprising:
    a main system memory to store a gather or scatter instruction; and
    a processor to fetch the stored instruction, the processor to access, responsive to the stored instruction, a first level cache of a multiple level memory hierarchy when a locality predictor logic predicts the first level cache as the best level in the hierarchy to perform future gathers and scatters based on any current and previous locality measurements of spatial and/or temporal locality for one or more current or previous gather or scatter operations, wherein operations of the gather or scatter instruction are steered to a lower level of the multiple level memory hierarchy than the first level cache based on one or more locality predictions for future gather or scatter data of little locality.

16. The system of claim 15, wherein the one of the one or more locality predictions is based, at least in part, on a threshold for cache hits of performing the gather or scatter operations at the first level cache.

17. The system of claim 15, wherein said locality measurements include a spatial locality measured by counting a number of cache lines accessed for said one or more current or previous gather or scatter operations.

18. The system of claim 17, wherein said locality measurements include a temporal locality measured by counting a number of cache hits for said one or more current or previous gather or scatter operations at a given level of the memory hierarchy.

19. The system of claim 18, wherein determining whether to perform the gather or scatter operations at the first level, is based on the temporal locality measured in the first level cache for a single gather or scatter operation.

20. The system of claim 17, wherein determining whether to perform the gather or scatter operations at the first level, is based on a threshold number of cache lines accessed for a single gather or scatter operation if a predicted cache hit rate is too low.

* * * * *